United States Patent [19]
Galer

[11] Patent Number: 4,504,335
[45] Date of Patent: Mar. 12, 1985

[54] METHOD FOR MAKING REINFORCED CEMENT BOARD

[75] Inventor: Richard E. Galer, Hanover Park, Ill.

[73] Assignee: United States Gypsum Company, Chicago, Ill.

[21] Appl. No.: 515,399

[22] Filed: Jul. 20, 1983

[51] Int. Cl.[3] ........................ B32B 31/08; B32B 31/18; B32B 13/14

[52] U.S. Cl. ........................................ 156/42; 118/106; 156/269; 156/347; 428/703

[58] Field of Search ........................ 156/39, 41, 42, 44, 156/45, 346, 347, 269; 118/100, 106, 120, 315, 323; 425/110, 122, 371, 364 R, 366; 264/112, 113, 257, 263, 271.1, 273; 198/364, 635, 637; 428/247, 703

[56] References Cited

U.S. PATENT DOCUMENTS

| | | | |
|---|---|---|---|
| 1,511,500 | 10/1924 | Brookby | 428/703 |
| 3,409,117 | 11/1968 | Bogner et al. | 198/364 |
| 3,459,620 | 8/1969 | McCleary et al. | 156/346 |
| 3,532,576 | 10/1970 | Proctor et al. | 156/348 |
| 3,929,947 | 12/1975 | Schwartz et al. | 264/42 |
| 4,108,301 | 8/1978 | Trozzi | 198/633 |
| 4,159,361 | 6/1979 | Schupack | 428/240 |
| 4,203,788 | 5/1980 | Clear | 156/44 |
| 4,298,413 | 11/1981 | Teare | 156/42 |

FOREIGN PATENT DOCUMENTS 772581 4/1957 United Kingdom .

*Primary Examiner*—Robert Dawson
*Attorney, Agent, or Firm*—Robert M. Didrick; Samuel Kurlandsky; Robert H. Robinson

[57] ABSTRACT

A cement board of homogeneous composition from face to face and having a substantially uniform thickness is made continuously by distributing a sole cementitious composition on a moving carrier sheet and smoothing the surface by rotating a cylindrical roller in a direction counter to the movement of the carrier sheet. An upper reinforcing network is submerged under the surface by feeding it under the counter rotating roller.

4 Claims, 3 Drawing Figures

METHOD FOR MAKING REINFORCED CEMENT BOARD

This invention relates to the continuous production of cementitious panels. More particularly, it relates to a system for casting a hydraulic cement mixture in the form of a thin, indefinitely long panel. Still more particularly, it relates to a method and an apparatus for the continuous, uniform distribution of the cement across the breadth of a moving support surface at the initial stage of such casting.

The mortar herein is a mixture of water and at least one inorganic cementitious material, as exemplified by a portland cement; it also may contain sand, mineral or non-mineral aggregate, fly ash, accelerators, plasticizers, foaming agent and other admixtures.

A substantially uniform thickness across the length and breadth of such panels is essential for their use in side-by-side array on walls, ceilings, or floors. Control of the thickness by means of screeds is limited by the flow properties of the hydraulic cement mortar. Mortars are usually thixotropic but often do not yield quickly enough to be spread evenly by a passive screed bar suspended across a fast moving conveyor belt. Aggregate-filled mortars, especially those having a low water to cement ratio, are particularly resistant to flow. Irregularity in the amount of such mortars distributed on a fast moving conveyor belt tends to cause unevenness in the so-called "cement boards" and other building panels manufactured on high speed production lines.

Building panels are made commonly in widths of from 30 to 48 inches (11.8 to 18.9 cm). The discharge of a cementitious mortar onto a moving conveyor belt directly from a continuous mixer would present a continuous ridge of rather immobile material to a downstream screed. The spread of a mortar deposited by a distribution chute or feeder conveyor is determined in large part by the width of such distribution means. Such means could be as wide as the desired panel but unless the discharge port of the mixer is equally wide, which is impractical, the distribution means, even when vibrated, cannot be relied upon to deposit a layer of uniform thickness on the panel-supporting conveyor belt. The problem is particularly acute when the top as well as the bottom face of the cement board is to be reinforced by applying a continuous length of a glass fiber scrim or the like to the surface and causing the mortar to form a thin cover on the scrim.

British Patent Specification No. 772,581 teaches the production of reinforced plaster board by a method which comprises spreading plaster on a first conveyor belt, dumping said plaster onto a plaster-soaked reinforcing mesh which is being transported by a second conveyor belt, and passing said plaster under a pressure roller to produce a ribbon of the required thickness. A second plaster-soaked mesh is dragged onto the upper surface of the ribbon as the mesh is fed under a third conveyor belt mounted above and in pressing relation to said ribbon of plaster.

In U.S. Pat. No. 4,203,788, the patentee, Clear, teaches a method for making reinforced cementitious panels which comprises drawing a first web of reinforcing fibers through a slurry of hydraulic cement, laying the slurry-laden web on carrier sheets supported and conveyed by a conveyor belt and depositing a cementitious core mix on the slurry-laden web. The upper surface of the core mix is smoothed by a series of paddlewheel screeds which rotate counter to the direction of the production line. The core is then rolled under a compaction roll and a second reinforcing web is passed through a cementitious slurry and layed onto the surface of the compacted core.

In U.S. Pat. No. 4,159,361, Schupack teaches an apparatus for forming cementitious panels, the apparatus comprising a forming table and a fabrication train which reciprocates longitudinally over the table. The panel is made by moving the fabrication train, which includes a mortar-depositing hopper and a laterally oscillating screed bar, over the table. As the layer of mortar is deposited longitudinally, it is smoothed by the screed bar as it moves back and forth across the breadth of the table. Thus, instead of depositing the cementitious mixture onto a moving conveyor belt to form an indefinitely long, broad ribbon of mortar, the mixture is laid onto a stationary table by moving the hopper and screed bar at right angles to each other. The length and width of the panel are limited by the length of the forming table and the width of the hopper's outlet. The casting of a stack of panels as taught by Schupack is necessarily an intermittent process because the mortar in each panel must have reached the initial set stage before another panel may be cast on top of it.

Thus, there still remains a need for a method for the continuous production of a uniformly thick, strong reinforced cement board from but one cementitious composition.

It is an object of this invention, therefore, to provide a method for forming a cement board having a uniform cross-section, both longitudinally and latitudinally, on a continuous production line.

It is a further object of this invention to provide a method for the continuous production of a cement board having a homogeneous body extending from one face of the board through the opposite face.

It is a related object of this invention to provide a method for submerging an indefinite length of a dry reinforcing fiber network in the top surface of a body of mortar while said body is being formed into an indefinitely long concrete panel on a continuous production line.

These and other objects which will become apparent are achieved by a method which employs but one cementitious composition and which comprises towing an indefinitely long carrier sheet under a continuous stream of mortar flowing from a mixer, distributing the mortar across the breadth of the carrier sheet, towing the mortar-laden carrier sheet through a slit defined by the support surface and a cylindrical screeding roller which is mounted tranversely above and parallel to the carrier sheet at a height corresponding to the desired board thickness, contacting the mortar with the screeding roller and rotating the roller in the opposite direction. The method may be used to full advantage when it is desired that the board be reinforced by submerging a network of glass, metal, aramid or other fibers immediately below the screeded surface. In a preferred embodiment of the invention, therefore, an indefinitely long network of reinforcing fibers is embedded in the upper surface layer of mortar by pulling the network against the roller and through the slit. In pressing down upon the mortar and the network, the counter-rotating roller picks up a thin coating of the mortar and wipes it against the fibers as the network emerges from the slit. Thus, the mortar on the roller is kept fresh and the voids of the network are filled. No further smoothing or pressing of the mortar is necessary.

A network of reinforcing fibers may also be set into the lower surface of the board as will be described below. The body of the cured board is, however, a substantially homogeneous body of set concrete which extends from one face of the board through the interstices of the reinforcing networks to the opposite face.

The method and the apparatus employed therein are more fully described with reference to the drawings, in which.

Figure 1:
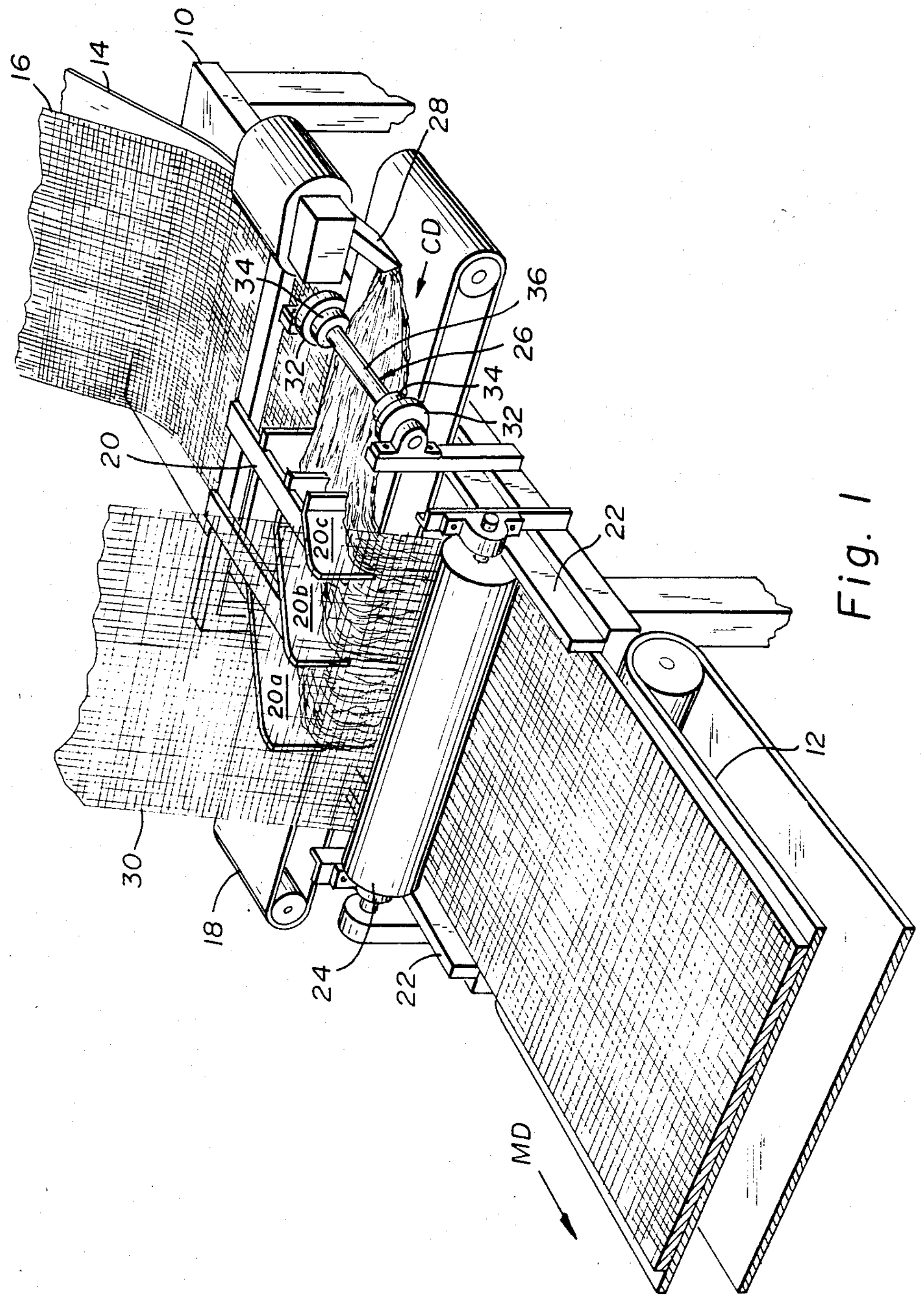
FIG. 1 is a perspective view of the mortar distributing and fiber embedding apparatus of this invention.

In FIG. 1, the forming table 10 and the conveyor belt 12 constitute the support for the carrier sheet 14 and the reinforcing network 16. Mounted transversely above the forming table 10 are the mortar distribution belt 18 and the stationary plow 20 whose blades 20*a*, 20*b*, and 20*c* contact the surface of the distribution belt 18 in scraping relationship. The side rails 22 rest at each side of the carrier sheet 14 on the forming table 10. The mortar screeding roller 24 is mounted between the side rails 22 and is adjustable so that the nip between it and the carrier sheet 14 may be set to the desired thickness of the panel to be manufactured. The roller 24 is journalled and driven by conventional means not shown. The mortar distributing wheel 26 is mounted transversely to the distribution belt 18 and downstream from the continuous mixer 28.

Figure 2:
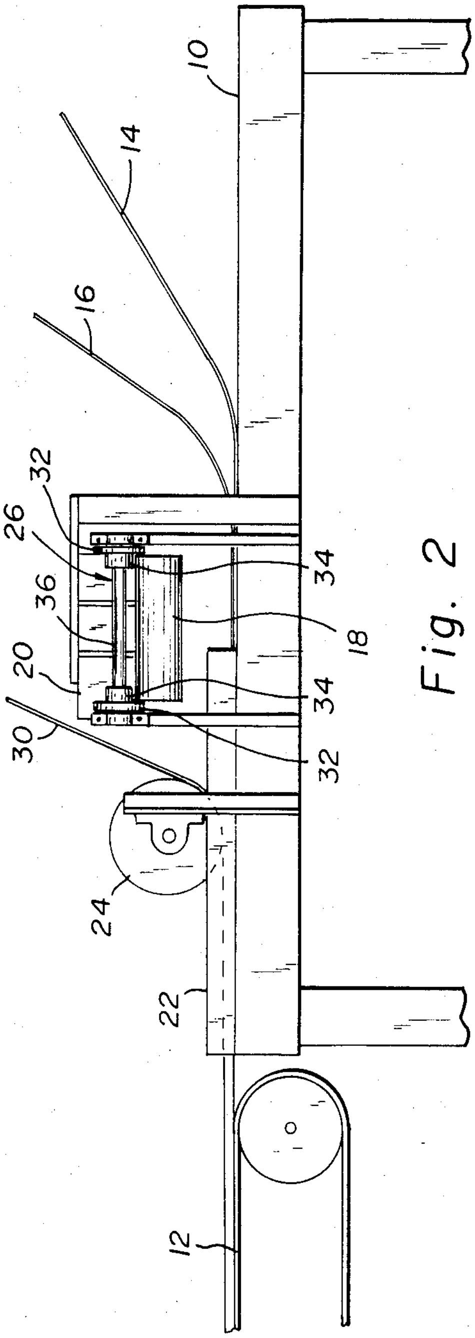
FIG. 2 is a side elevational view of the apparatus shown in FIG. 1.
Figure 3:
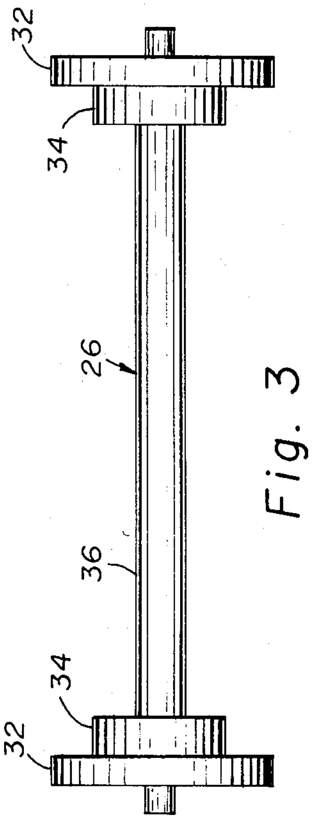
FIG. 3 is an elevational view of a specific embodiment of the mortar metering apparatus of this invention.

In FIG. 2, the relationship between the forming table 10, the conveyor belt 12, the carrier sheet 14, the reinforcing network 16, the distributor belt 18, the mortar distributing wheel 26, the plow 20, the mortar screeding roller 24 and a second reinforcing network 30 is shown. The flanges 32 of the wheel 26 engage the edges of the belt 18 while the collars 34 engage the surface of said belt. The height of the axle 36 above the belt 18 is determined by the difference between the radius of the collars and the radius of the axle.

Having observed the details of the apparatus and the system of which it is a part, attention is now given to the details of the method of this invention.

Continuous strips of a strippable paper sheet 14 and the reinforcing network 16 are fed from rolls (not shown) to pass over the forming table 10, under the distribution belt 18 and the screeding roller 24, and onto the conveyor belt 12 where they are weighted down so that, when moving, said belt can tow them in the direction indicated by the arrow MD. The distribution belt 18 is set in motion so that the upper surface travels in the direction indicated by the arrow CD. The continuous mixing of mortar is commenced and the mortar is discharged directly onto the belt 18 by the mixer 28. The distributing wheel 26 is rotated counter to the direction of travel indicated by the arrow CD. The axle 36 spreads the mortar across the belt 18 so that each of the plow blades 20*a*, 20*b*, and 20*c* are presented with substantially equal amounts of mortar to be deflected onto the moving carrier sheet 14 and the network 16. The flanges 32 of the wheel 26 act as skirts to retain mortar on the surface of the belt 18 as it is being squeezed under the axle 36. The relatively stiff, immobile mortar tends to remain in place on the belt 18 after being spread and flattened by the combined momentum of the belt 18 and the axle 36. Each of the plow blades deflect a stream of mortar onto the sheet 14 and network 16 and these streams are merged and melded by the counter-rotating roller 24 so that a broad, flat ribbon of mortar emerges at the downstream side of the roller 24. The counter rotation of the roller 24 tends to retard the advance of the mortar slightly so that the entire nip is constantly full of mortar and a laterally extending pile of mortar co-extensive with the slit is established immediately upstream from the nip and constantly replenished. If an upper layer of reinforcing fiber is desired in the panel, the second network 30 is fed into the nip between the roller 24 and the advancing mortar. Although the roller 24 is rotating counter to the direction of the mortar, the network 30 is dragged through the slit by the mortar. The roller 24 presses the network into the mortar's surface and cleans itself of adhering mortar by wiping such mortar onto the surface and into the interstices of the network 30. The reinforcing fiber thus becomes encased in the broad, flat ribbon of mortar which is ready to be cut after it sets.

The rotational speed of the roller 24 may be varied according to the line speed of the conveyor belt 12 and it also may be varied to impart different characteristics to the surface of the mortar.

What is claimed is:

1. A method for the continuous production of an indefinitely long cementitious panel having a cross section of substantially uniform thickness, said method employing but one cementitious composition and comprising: towing an indefinitely long carrier sheet over a supporting surface and under a continuous stream of mortar, distributing the mortar across the breadth of the carrier sheet, towing the mortar-laden carrier sheet through a slit defined by said supporting surface and a cylindrical mortar screeding roller mounted above the supporting surface so that its axis is transversely parallel to the supporting surface, dragging a dry, indefinitely long network of reinforcing fibers against the roller and through the slit, rotating the roller counter to the direction of travel of the carrier sheet, whereby the roller presses the network into the surface of the mortar and wipes mortar adhering to the roller into the interstices of the network, and towing the resulting broad, flat ribbon of mortar toward a cutter.

2. The method of claim 1 wherein the cementitious composition is an aggregate-filled mortar.

3. A method for the continuous production of a cement board having a substantially uniform thickness and a homogeneous body, said method comprising towing an indefinitely long carrier sheet over a support surface, distributing a sole cementitious mixture across the breadth of the moving carrier sheet, contacting the cementitious mixture with a cylindrical screed, retarding the advance of the cementitious mixture by rotating the cylindrical screed counter to the direction of movement of the carrier sheet so that the entire nip is constantly full of the mixture, dragging a dry, indefinitely long network of reinforcing fibers against the screed and through the cementitious mixture in the nip, whereby the roller presses the network into the upper surface of the cementitious mixture and wipes cementitious mixture adhering to the roller into the interstices of the network, and cutting the resulting flat board into the desired lengths.

4. The method of claim 3 wherein the cementitious mixture is an aggregate-filled mortar.

* * * * *